US009839854B2

(12) United States Patent
van Welzen et al.

(10) Patent No.: US 9,839,854 B2
(45) Date of Patent: Dec. 12, 2017

(54) BUILT-IN SUPPORT OF IN-GAME VIRTUAL SPLIT SCREENS WITH PEER-TO PEER-VIDEO CONFERENCING

(71) Applicant: Nvidia Corporation, Santa Clara, CA (US)

(72) Inventors: James van Welzen, Durham, NC (US); David Le Tacon, Cedar Park, TX (US)

(73) Assignee: Nvidia Corporation, Santa Clara, CA (US)

( * ) Notice: Subject to any disclaimer, the term of this patent is extended or adjusted under 35 U.S.C. 154(b) by 30 days.

(21) Appl. No.: 14/970,095

(22) Filed: Dec. 15, 2015

(65) Prior Publication Data

US 2017/0165569 A1 Jun. 15, 2017

(51) Int. Cl.
| | |
|---|---|
| *A63F 13/87* | (2014.01) |
| *A63F 13/86* | (2014.01) |
| *A63F 13/34* | (2014.01) |
| *H04N 7/15* | (2006.01) |
| *A63F 13/355* | (2014.01) |
| *A63F 13/32* | (2014.01) |
| *A63F 13/213* | (2014.01) |
| *A63F 13/215* | (2014.01) |
| *A63F 13/30* | (2014.01) |
| *A63F 13/25* | (2014.01) |

(52) U.S. Cl.
CPC ............ *A63F 13/87* (2014.09); *A63F 13/213* (2014.09); *A63F 13/215* (2014.09); *A63F 13/25* (2014.09); *A63F 13/30* (2014.09); *A63F 13/32* (2014.09); *A63F 13/34* (2014.09); *A63F 13/355* (2014.09); *A63F 13/86* (2014.09); *H04N 7/15* (2013.01); *A63F 2300/401* (2013.01)

(58) Field of Classification Search
CPC ........ A63F 13/213; A63F 13/25; A63F 13/30; A63F 13/34; A63F 13/86; A63F 13/87; A63F 2300/401; G07F 17/3225; G07F 17/3272
See application file for complete search history.

(56) References Cited

U.S. PATENT DOCUMENTS

| | | | | |
|---|---|---|---|---|
| 6,652,378 | B2 * | 11/2003 | Cannon | G07F 17/32 463/20 |
| 8,647,206 | B1 * | 2/2014 | Gottlieb | A63F 13/12 463/40 |
| 8,827,791 | B2 * | 9/2014 | Doorgeest | A63F 13/26 463/16 |
| 2002/0183105 | A1 * | 12/2002 | Cannon | G07F 17/32 463/16 |

(Continued)

*Primary Examiner* — David Duffy (57) ABSTRACT

Methods of providing in-game virtual split screens with peer-to-peer video conferencing are described for use in online gaming, for instance. In one approach, a live video stream, a live audio stream, and a player viewpoint are sent from a first computer system for receipt by a second computer system. The first and second computer systems concurrently execute the online game. The live video stream, the in-game video stream, and locally rendered in-game content are combined to create a composite video stream, and the live audio stream, the in-game audio stream, and locally generated in-game audio are combined to create a composite audio stream. The composite video stream and the composite audio stream are operable to be presented at the second computer system in real-time.

16 Claims, 11 Drawing Sheets

(56) References Cited

U.S. PATENT DOCUMENTS

| | | | | |
|---|---|---|---|---|
| 2004/0106446 A1* | 6/2004 | Cannon | ............... | G07F 17/32 |
| | | | | 463/16 |
| 2006/0217199 A1* | 9/2006 | Adcox | ............... | G07F 17/3223 |
| | | | | 463/40 |
| 2007/0178955 A1* | 8/2007 | Mills | ............... | A63F 1/00 |
| | | | | 463/13 |
| 2009/0119730 A1* | 5/2009 | Perlman | ............... | A63F 13/12 |
| | | | | 725/114 |
| 2009/0291762 A1* | 11/2009 | Walker | ............... | G07F 17/32 |
| | | | | 463/42 |
| 2012/0172117 A1* | 7/2012 | Doorgeest | ............... | A63F 13/26 |
| | | | | 463/31 |
| 2013/0123019 A1* | 5/2013 | Sullivan | ............... | A63F 13/12 |
| | | | | 463/42 |
| 2013/0329010 A1* | 12/2013 | Kim | ............... | H04N 13/0207 |
| | | | | 348/43 |
| 2014/0024430 A1* | 1/2014 | Wisler | ............... | G07F 17/34 |
| | | | | 463/20 |
| 2014/0364189 A1* | 12/2014 | Doorgeest | ............... | A63F 13/26 |
| | | | | 463/19 |
| 2016/0136521 A1* | 5/2016 | Doorgeest | ............... | A63F 13/26 |
| | | | | 463/19 |

* cited by examiner

BUILT-IN SUPPORT OF IN-GAME VIRTUAL SPLIT SCREENS WITH PEER-TO PEER-VIDEO CONFERENCING

FIELD

Embodiments of the present invention generally relate to the field of multiplayer gaming. More specifically, embodiments of the present invention relate to systems and methods for providing in-game screen sharing and video communication using virtual split screens for multiplayer gaming.

BACKGROUND

There is a growing need, in the field of computer gaming, to share multimedia content and communications in real-time with other connected (e.g., online) players without interrupting in-game activity. To this end, some multiplayer games provide in-game text or voice chat to enable real-time communications between players as an alternative to external devices or third-party chat applications. However, providing concurrent video and audio communications in-game in real-time is more complicated and requires more bandwidth and processing capabilities than text or audio communications alone.

In addition to providing real-time video communications captured using a camera and audio communications captured using a microphone, there is a growing need to share activity and events that occur in-game with other players in real-time. For example, cooperative (co-op) first-person shooting games (FPS) and massively multiplayer online games (MMOs) may organize players into squads or teams that share a common objective. In these situations, it is often desirable for team members to share information with one another, including real-time visual representations of the game world from another player's perspective. However, this ability is not often supported by game developers due to the complexity of implementing such a system on a wide scale.

SUMMARY

A method and apparatus for providing built-in support for virtual split screens with peer-to-peer video is disclosed herein. Embodiments of the present invention enable a user to share real-time audio and video communications and player viewpoint data with other players during multiplayer gaming.

According to one embodiment, a method of sharing player viewpoint data and audio-video communication with remote players of an online game is disclosed. The method includes executing the online game using a processor and a memory of a computer system, capturing a live video stream using a camera coupled to the computer system, capturing a live audio stream using a microphone coupled to the computer system, and generating player viewpoint data of the online game during execution, where the player viewpoint data comprises an in-game video stream and an in-game audio stream. The live video stream, the live audio stream, and the player viewpoint data are sent to a second computer system using a computer network, where the second computer system is operable to concurrently execute the online game. The live video stream and the in-game video stream are combined to create a composite video stream, the live audio stream and the in-game audio stream are combined to create a composite audio stream, and the composite video stream and the composite audio stream are rendered at the second computer system alongside in-game content generated by the second computer system.

According to another embodiment, an apparatus for sharing player viewpoint data and audio-video communication with remote players of an online game is described. The apparatus includes a processor and memory configured to execute instructions of an online game, where the instructions, when executed, generate local in-game audio data and local in-game video data, a camera for capturing a local real-time video stream, a microphone for capturing a local real-time audio stream, and a network streamer for sending the local in-game audio data, the local in-game video data, the local real-time video stream, and the local real-time audio stream for reception by a host using a computer network and receiving data from a second computer system using the computer network. The apparatus further includes a video compositor for combining remote in-game video data, remote real-time video data, and local in-game video data to create a composite video stream, and an audio compositor for combining remote in-game audio data, remote real-time audio data, and local in-game audio data to create a composite audio stream.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In-Game Virtual Split Screen With Peer-To-Peer Video Conferencing

Embodiments of the present invention are drawn to exemplary computing devices generally having a network interface component, a video camera, and a microphone. The following discussion describes one such exemplary computing device.

Figure 1A:
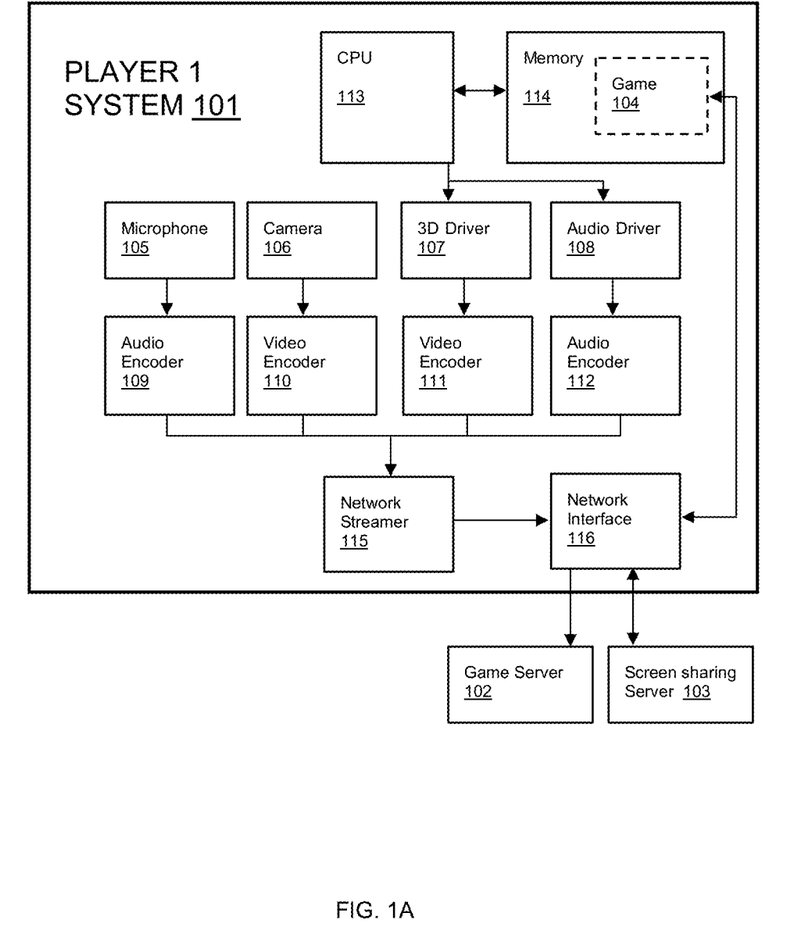
FIG. 1A is a block diagram of an exemplary computer system for sending real-time communications and player viewpoint data according to embodiments of the present invention.

In the example of FIG. 1A, the exemplary computer system 101 includes a central processing unit (CPU) 113, memory 114, and network streamer 115 for sending real-time audio and video communications and player viewpoint data to other players during multiplayer gaming. In the context of the present invention, "real-time" refers to a near-real-time or perceptually real-time constraint or delay. System 101 is associated with an exemplary user, "Player 1". CPU 113 runs software applications such as games (e.g., game 104) and optionally an operating system. Memory 114 may comprise random access memory and/or read-only memory for storing applications and other data. A network streamer 115 allows computer system 101 to communicate with screen sharing server 103 used for sharing real-time communications and player viewpoint data with other online players. The network streamer 115 is coupled to network interface 116 to communicate with other computer systems, networks, or devices via an electronic communications network, including wired and/or wireless communication and including an Intranet or the Internet.

In the embodiment of FIG. 1A, microphone 105 and camera 106 are used to capture real-time audio and video data. Microphone 105 captures audio (e.g., voice chat) from the payer, and camera 106 captures video of the player. Audio data captured by microphone 105 is optionally encoded and/or compressed by audio encoder 109, and video data captured by camera 106 is optionally encoded and/or compressed by video encoder 110. Audio encoder 109 and video encoder 110 pass the encoded and/or compressed data to network streamer 115.

System 101 of FIG. 1A further comprises 3D driver 107 and audio driver 108. 3D driver 107 interfaces with CPU 113 to generate graphics data suitable for display on a monitor or television, for example. 3D driver 107 accepts commands and data from CPU 113 and generates signals with suitable voltage, current, timing and/or demultiplexing to generate formatted graphics for display. In one illustrative example, during execution of game 104 by CPU 113, 3D driver 107 receives instructions comprising graphics data from CPU 113 and translates the instructions to be encoded by video encoder 111. According to some embodiments, 3D driver 107 receives graphics data from an operating system of computer system 101 and translates the instructions for display.

Audio driver 108 receives audio data from CPU 113 and generates signals with suitable voltage, current, timing and/or demultiplexing to generate formatted audio for playback. In on illustrative example, during execution of game 104 by CPU 113, audio driver 108 receives instructions comprising audio data from CPU 113 executing game 104 and translates the instructions to be encoded by audio encoder 112. According to some embodiments, audio driver 108 receives audio data from an operating system of computer system 101 and converts the audio to a format suitable for playback.

Network streamer 115 receives data from video encoders 110 and 111 and audio encoders 109 and 111 and prepares the data for transmission to another system or device using network interface 116. Network interface 116 comprises an Ethernet or wireless network adapter for sending and receiving data over a computer network. Network streamer 115 receives audio and video data captured using microphone 105 and camera 106, respectively. Network streamer 115 also receives in-game graphics and audio content from video encoder 111 and audio encoder 112 for transmission.

Network streamer 115 prepares the in-game and real-world multimedia data for sharing with other connected devices, and may be configured to share the data over a network connection (e.g., network interface 116) using a peer-to-peer or star network topology. An exemplary peer-to-peer network topology for sharing in-game and real-world audio and video data is described in FIG. 3A, and an exemplary star network topology for sharing in-game and real-world audio and video data is described in FIG. 3B. Network streamer 115 may transmit the multimedia data using the WebRTC standard, for example. WebRTC is an API definition that supports light-weight applications for voice calling, video chat, and P2P file sharing and does not require internal or external plugins.

Network interface 116 comprises a hardware network interface or wireless interface for connecting to a local area network, Intranet, or the Internet. Network interface 116 is used by network streamer 115 to transmit audio and video data to screen sharing server 103. Network interface 116 is also sends data (e.g., game-state, player input, etc.) from game 104 to game server 102, and also to receive data from game server 102 to be used by game 104 during execution.

Figure 1B:
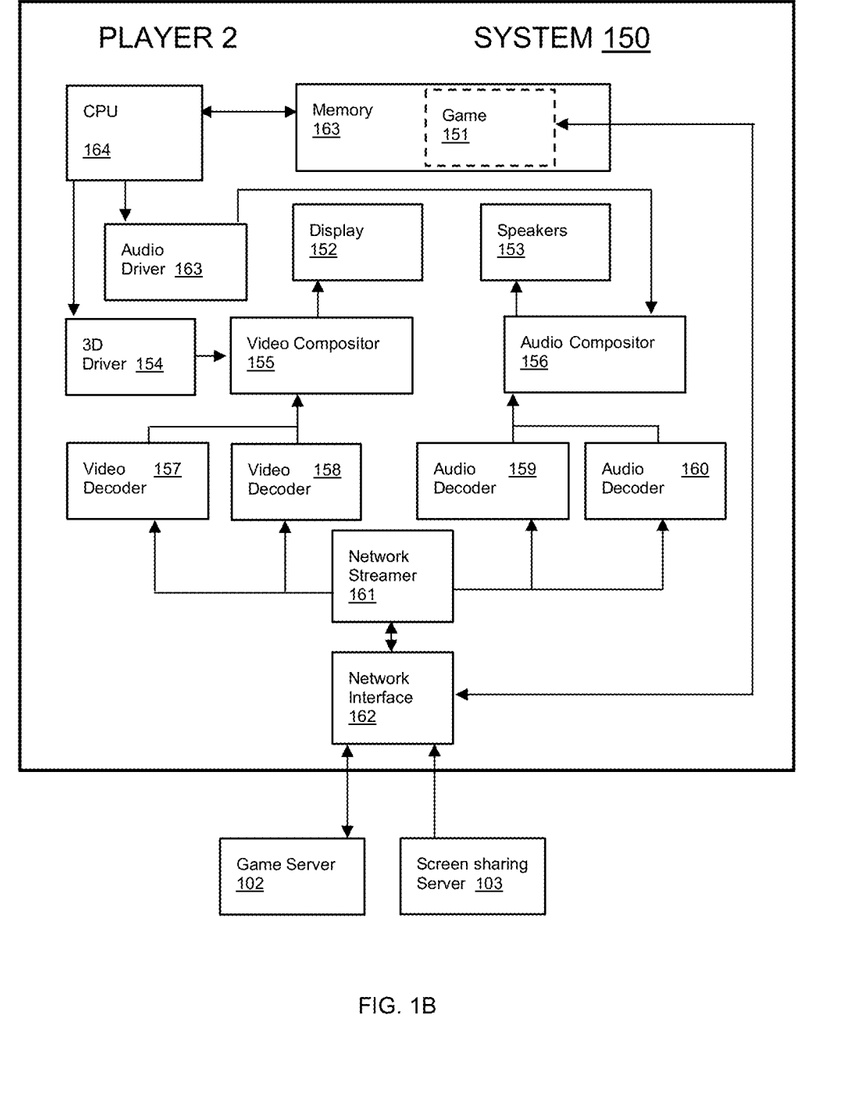
FIG. 1B is a block diagram of an exemplary computer system for receiving and presenting real-time communications and player viewpoint data according to embodiments of the present invention.

FIG. 1B is a block diagram of an exemplary computer system 150 for receiving and reproducing real-time communications and in-game data (e.g., player viewpoint data) according to embodiments of the present invention. System 150 is associated with an exemplary user, Player 2. In the example of FIG. 1B, the exemplary computer system 150 includes a central processing unit (CPU) 164, memory 163, and network streamer 161 for sending real-time audio and video communications and player viewpoint data during multiplayer gaming. CPU 164 runs software applications such as games (e.g., game 104) and optionally an operating system. Memory 114 may comprise random access memory and/or read-only memory for storing applications and other data.

A network streamer 161 enables computer system 150 to communicate with game server 102 and screen sharing server 103 for sharing real-time communications and player viewpoint data with other on-line players. Network streamer 161 is coupled to network interface 162 to communicate with other computer systems, networks, or devices via an electronic communications network, including wired and/or wireless communication and including a local area network, Intranet or the Internet. Real-time communication (e.g., video and/or voice chat) data received by network streamer 161 from screen sharing server 103 is passed to video decoder 157 and audio decoder 159 for processing (e.g., decoding, decompressing, etc.). Network streamer 161 also receives real-time game data from screen sharing server 103 comprising audio and/or video data based on in-game assets. The game data comprising video data is sent to video decoder 158 for processing, and the game data comprising audio data is sent to audio decoder 160. The processed video data from video decoders 157 and 158 is sent to video compositor 155, and the processed audio from audio decoders 159 and 160 is sent to audio compositor 156. According to some embodiments, video compositor 155 and audio compositor 156 are a software component of an operating system. According to other embodiments, video compositor 155 and audio compositor 156 are hardware components located on a video card, sound card, processor, or motherboard, for example.

Still with regard to FIG. 1B, the processed video data from video decoders 157 and 158 is received by video compositor 155. Video compositor 155 also receives local game data comprising video/graphics data for rendering in-game assets from 3D driver 154. During execution of game 151 by CPU 164, 3D driver 154 receives instructions comprising graphics data from CPU 164 executing game 151 and translates the instructions for display. Translated instructions are sent to video compositor 155 for generating virtual split screens comprising in-game and real-world (e.g., video chat) content for presentation on display 152. Display 152 comprises a monitor, television, touchscreen, or projector, for example.

Processed audio data from audio decoders 159 and 160 is received by audio compositor 156. Audio compositor 156 also receives local game data comprising audio data based on in-game assets from audio driver 163. Audio driver 163 receives audio data from CPU 113 and generates signals with suitable voltage, current, timing and/or demultiplexing to generate formatted audio for playback. During execution of game 151 by CPU 164, audio driver 163 receives instructions comprising audio data from CPU 164 and translates the instructions for playback. The translated instructs are then sent to audio compositor 156 to combine in-game and real-world audio content for playback using speaker 153. Speaker 153 comprises a multi-channel surround sound system, TV speakers, or headphones, for example.

While the embodiment of FIG. 1A depicts an exemplary system for sending player viewpoint and communication data and the embodiment of FIG. 1B depicts an exemplary system for receiving player viewpoint and communication data, according to some embodiments, the systems are combined into a single system that is capable of both sending and receiving player viewpoint and communication data.

Displaying Virtual Split Screens Using Audio and Video Compositors

Figure 2A:
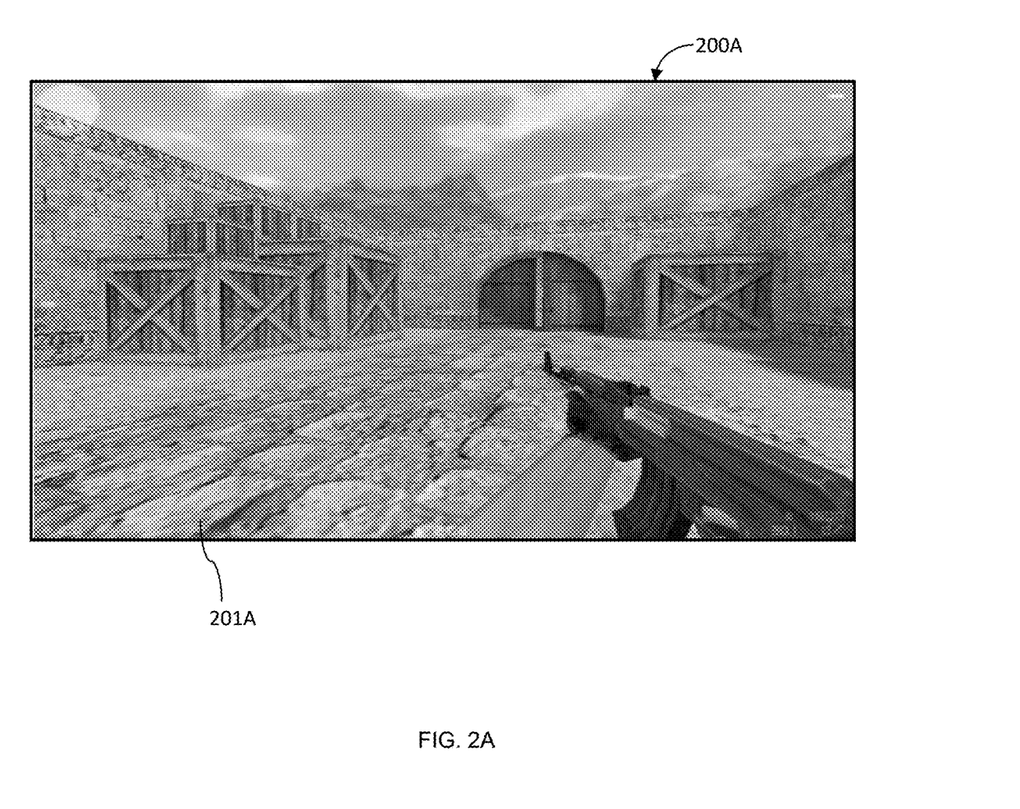
FIG. 2A is a diagram of an exemplary display screen for computer gaming without virtual split screens.

With regard to FIG. 2A, an exemplary display screen 200A for computer gaming without virtual split screens is depicted according to embodiments of the present invention. As depicted, display screen 200A displays game window 201A running in a full-screen mode without split screens or pop-up windows.

Figure 2B:
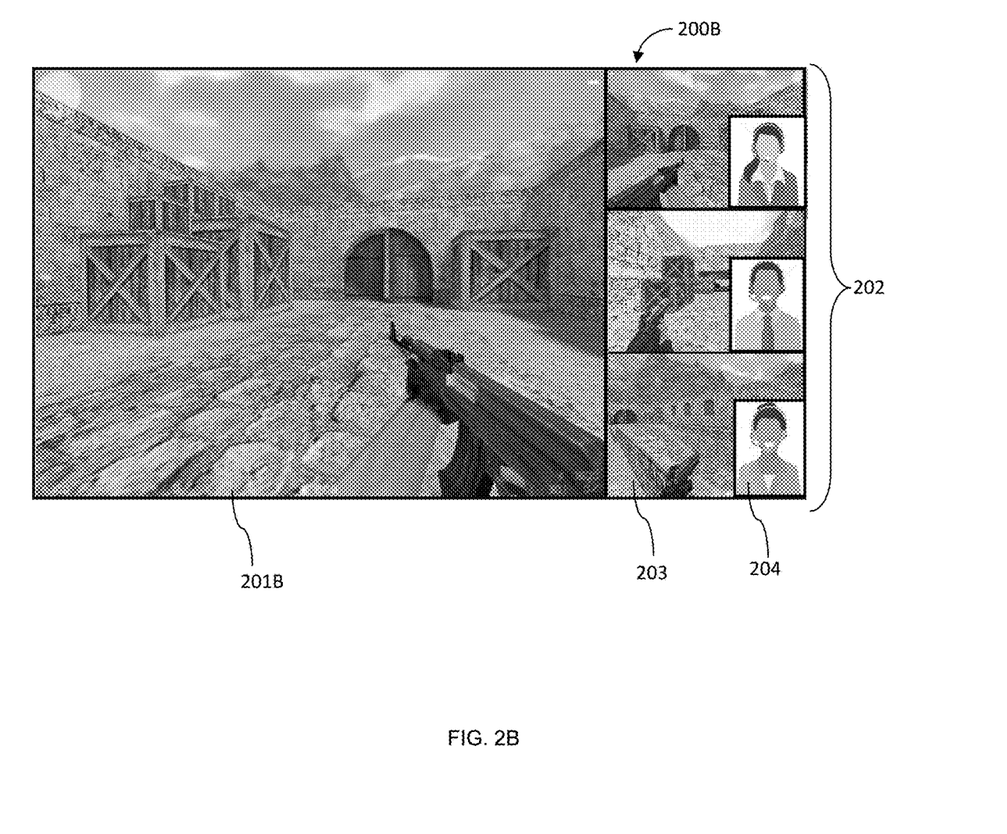
FIG. 2B is a diagram of an exemplary display screen with virtual split screens for providing real-time communication and player viewpoint data according to embodiments of the present invention.

With regard to FIG. 2B, an exemplary display screen 200B with split screen window 202 for providing real-time communications and player viewpoint data is depicted according to embodiments of the present invention. Game window 201B is displayed taking up a left portion of the display screen 200B. Game window 201B is resized so that split screen window 202 is displayed without obscuring or obstructing view of any in-game content. According to some embodiments, game window 201B is zoomed to preserve the native aspect ratio and prevent distortion. In the example of FIG. 2B, split screen window 202 comprises three virtual split screens. The split screens display a player viewpoint component (e.g., player viewpoint 203) comprising real-time, in-game content. The split screens also comprise a communication window (e.g., communications window 204) for displaying real-time video communications captured by a camera, with complementary audio captured using a microphone and played back through a speaker system. The communication windows can be disabled so that only player viewpoint data is displayed. According to some embodiments, the communication window portion of a split screen is only displayed while the associated user is actively communicating (e.g., speaking into a microphone).

Figure 2C:
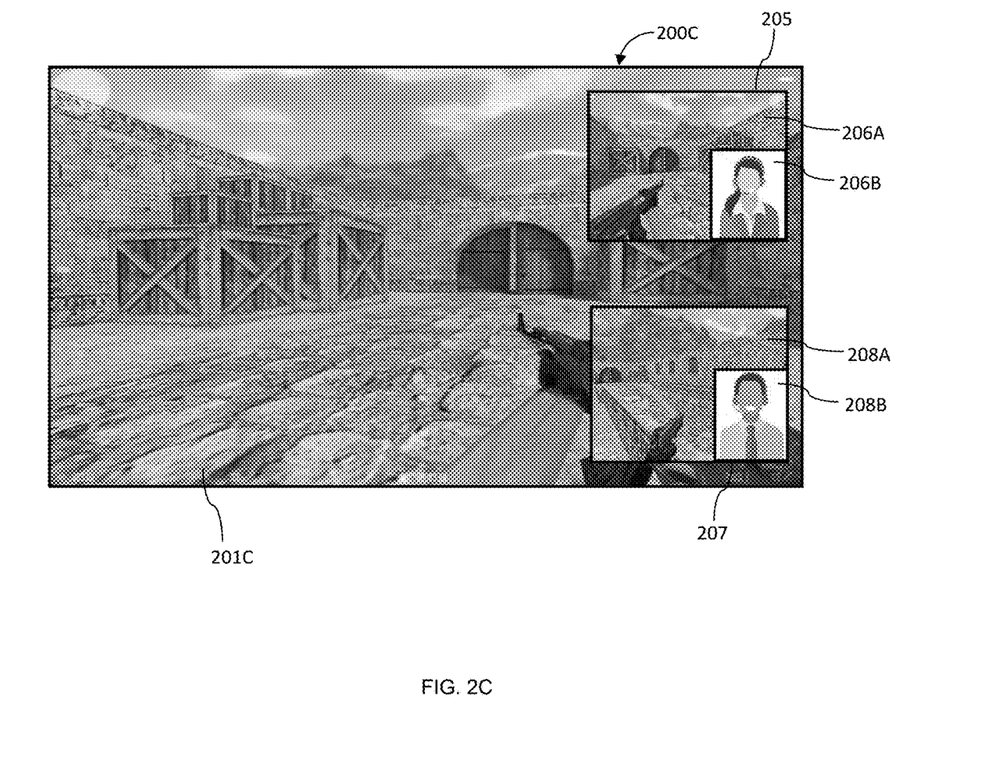
FIG. 2C is a diagram of an exemplary display screen with virtual pop-up windows for providing real-time communication and player viewpoint data according to embodiments of the present invention.

With regard to FIG. 2C, an exemplary display screen 200C with pop-up windows 205 and 207 for providing real-time communications and player viewpoint data is depicted according to embodiments of the present invention. In the example of FIG. 2C, game window 201C is not resized and some portions of the screen are obstructed by the pop-up windows. The pop-up windows may be resized to occupy more or less of the display screen. Similarly, the transparency/opaqueness of the windows may be adjusted to allow the player to view screen content behind the pop-up windows. The pop-up windows display a player viewpoint component (e.g., player viewpoint 206A and 208A) comprising real-time, in-game content. The pop-up windows also display a communication window (e.g., communication windows 206B and 208B) for displaying real-time audio and video communications captured by a camera and microphone. According to some embodiments, the pop-up windows are only displayed while the associated user is actively communicating (e.g., speaking into a microphone). In other embodiments, the pop-up windows are displayed only when the associated player is actively participating in the game and will not be displayed when the player is away (e.g., inactive) or disconnected.

Figure 2D:
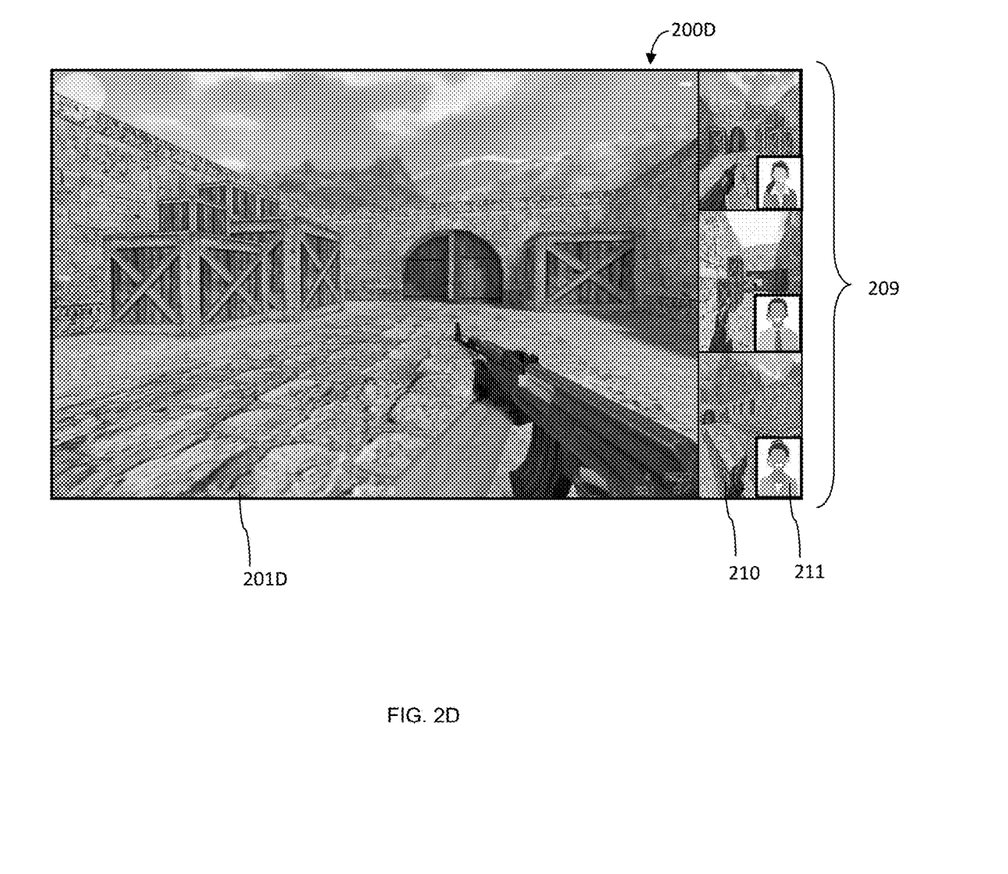
FIG. 2D is a diagram of an exemplary display screen with re-sized virtual split screens for providing real-time communication and player viewpoint data in a compact form according to embodiments of the present invention.

With regard to FIG. 2D, a diagram of an exemplary display screen 200D with compact virtual split screens for providing real-time communications and player viewpoint data is depicted according to embodiments of the present invention. In the example of FIG. 2D, split screen window 209 has been resized to consume less screen space in comparison to the example of FIG. 2B. Player viewpoint 210 and communication window 211 are displayed in a smaller form and game window 201D is extended to fill more screen space.

Figure 2E:
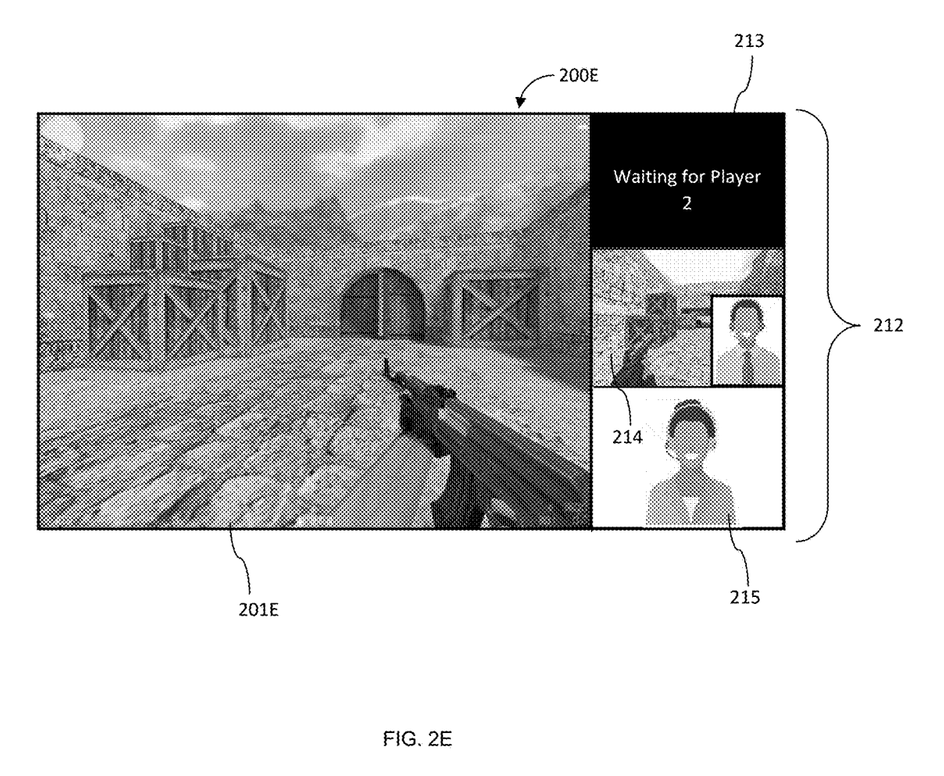
FIG. 2E is a diagram of an exemplary display screen with virtual split screens operating in various modes for providing real-time communication and player viewpoint data according to embodiments of the present invention.

With regard to FIG. 2E, an exemplary display screen 200E with virtual split screens operating in various modes for providing real-time communications and/or player viewpoint data is depicted according to embodiments of the present invention. In the example of FIG. 2E, split screen window 212 comprises three split screen windows 213-215. Split screen window 213 has been configured to present player viewpoint and communications data from exemplary user "Player 2" and waits for Player 2 to join the game. When Player 2 participates in the game as an active player, split screen window 213 presents Player 2's real-time communications and/or player viewpoint data. Split screen window 214 is configured to display both player viewpoint data as well as real-time communications from exemplary user "Player 3". Split screen window 215 is operating in communication mode to display only communications data (e.g., video chat) from exemplary user "Player 4". The display mode (e.g., communication mode, viewpoint mode, or both) of each split screen window may be changed at any time.

Figure 2F:
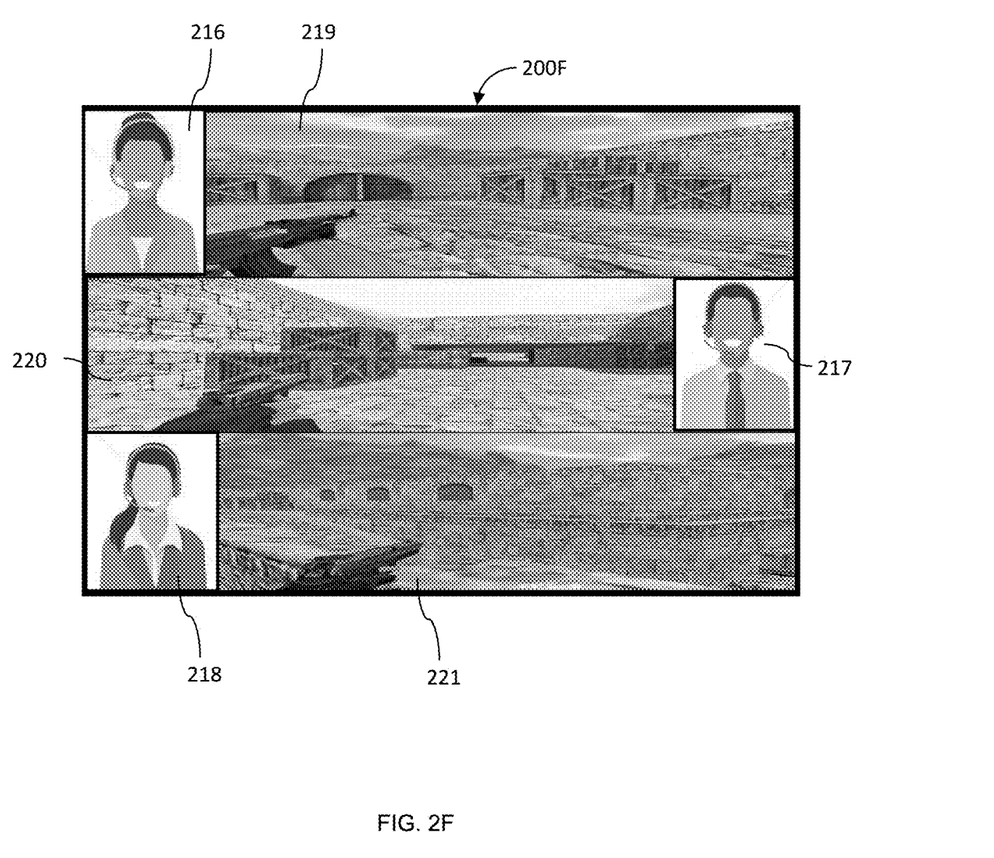
FIG. 2F is a diagram of an exemplary display screen with virtual split screens for providing real-time communications and player viewpoint data according to embodiments of the present invention

With regard to FIG. 2F, an exemplary display screen 200F with virtual split screens for providing real-time communications and player viewpoint data is depicted according to embodiments of the present invention. In the example of FIG. 2F, display screen 200F is displaying a full-screen virtual split screen window comprising three player viewpoint windows and three communication windows. Communication windows 216-218 presents video chat from on-line players, and player viewpoint windows 219-221 display the associated in-game player viewpoint. According to some embodiments, the center portion of screen 200F (e.g., communication window 217 and player viewpoint window 220) displays the activity of a local user.

Figure 3A:
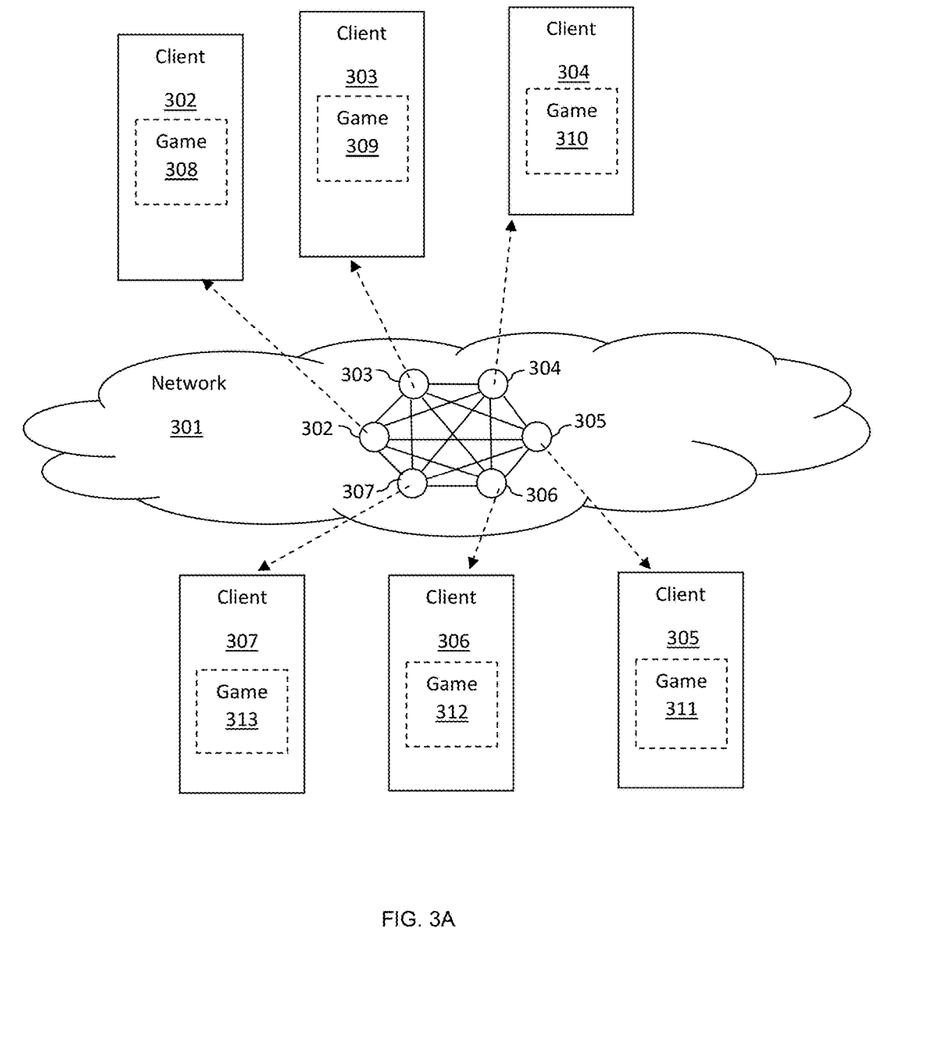
FIG. 3A is a diagram of an exemplary network architecture for providing real-time communication and player viewpoint data using a view server and a peer-to-peer network topology according to embodiments of the present invention.

With regard to FIG. 3A, a diagram of an exemplary network architecture for providing real-time communications and player viewpoint data using a peer-to-peer network is depicted according to embodiments of the present invention. Client systems 302-307 run games 308-313 and communicate game and communication (e.g., video chat) data to other peers using network 310. Network 310 comprises a local area network, intranet, and/or the Internet. In the example of FIG. 3A, Network 310 comprises a peer-to-peer network with nodes/clients 302-307. Each client is connected to one or more peers to send and receive viewpoint and communication data. For example, client system 302 running game 308 generates player viewpoint data and captures player communication data using a camera and a microphone. The data is processed by a network streamer and communicated over network 301 to client/peer 305. Client 305 receives the player viewpoint data and communication data and presents the viewpoint and communication data to the user using a display and speaker system. Client 305 sends the viewpoint data and communication data to client 303, and so on, until all active peers have received the viewpoint data and communication data generated by clients 302-307.

Figure 3B:
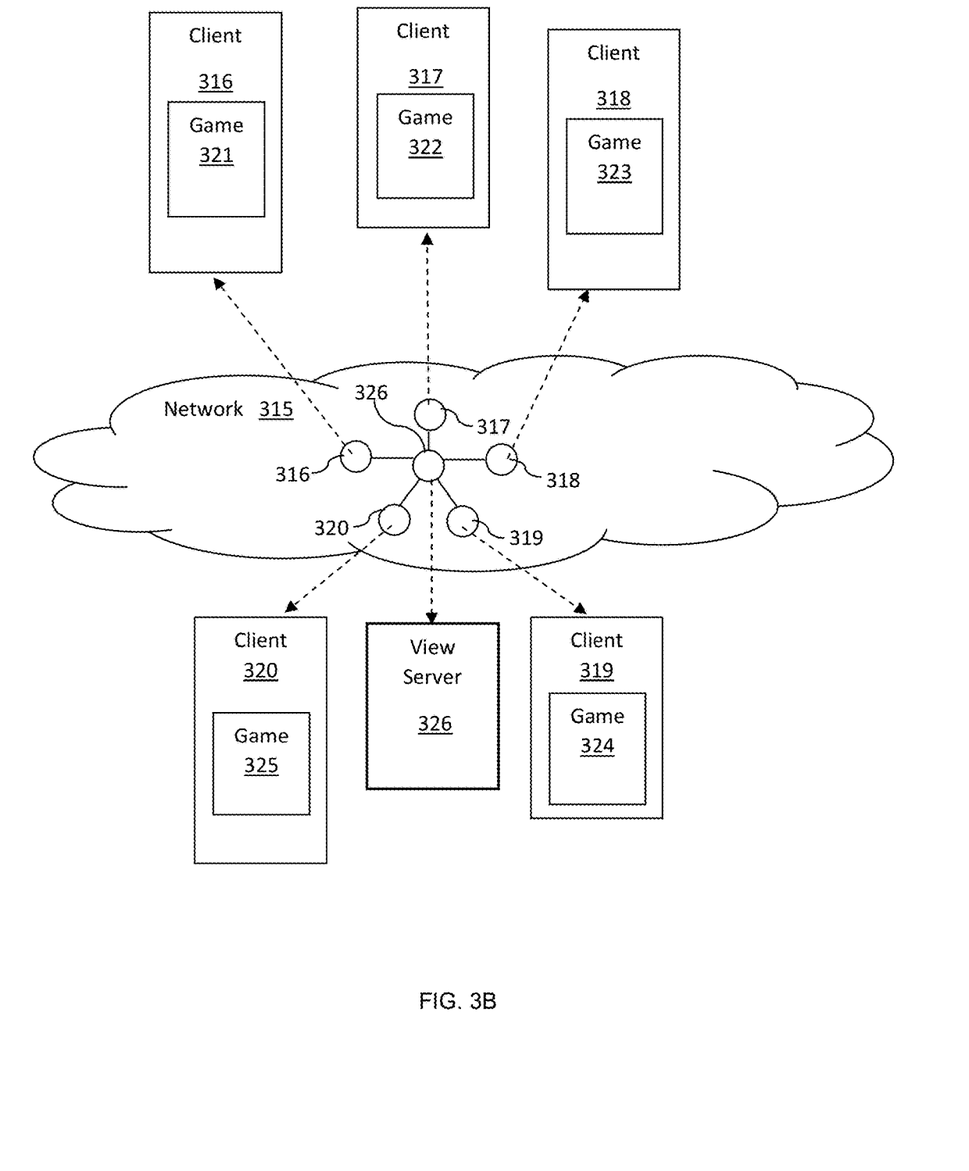
FIG. 3B is a diagram of an exemplary network architecture for providing real-time communication and player viewpoint data using a star network topology with a dedicated view server according to embodiments of the present invention.

With regard to FIG. 3B, a diagram of an exemplary network architecture for providing real-time communications and player viewpoint data using a dedicated view server and a star network topology is depicted according to embodiments of the present invention. Client systems 316-325 run games 321-324 and communicate viewpoint and communication data to view server 326 using network 315. Network 315 comprises a local area network, intranet, and/or the Internet. In the example of FIG. 3B, Network 315 comprises a network having a star topology with clients 316-325 connected to a central node/hub 326. The clients can send and receive viewpoint and communication data generated by other players using view server 326. For example, client system 316 running game 321 and client 230 running game 325 generate player viewpoint data and capture player communication data using cameras and microphones. The data is processed by a network streamer and communicated over network 315 to view server 326. Client 318 receives the player viewpoint data and player communication data from view server 326 using network 315. The player viewpoint data is presented on a display connected to client 318 during execution of game 323 alongside in-game content rendered locally. The communication data is presented in a communication window on the display and voice audio is played through speakers connected to client 318.

Figure 4:
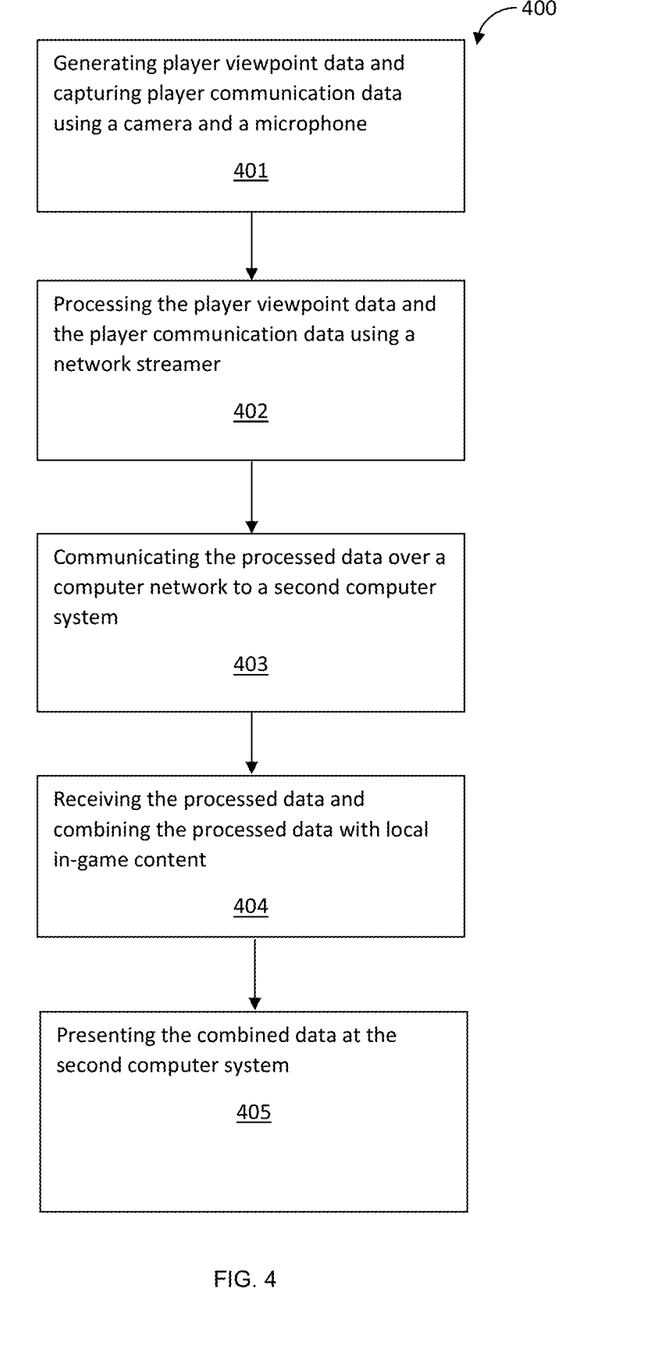
FIG. 4 is a flowchart depicting an exemplary sequence of computer implemented steps for providing in-game screen sharing and audio-video communication using virtual split screens for multiplayer gaming according to embodiments of the present invention.

With regard to FIG. 4, a flowchart depicting an exemplary sequence of computer implemented steps 400 for providing in-game screen sharing and audio-video communication using virtual split screens for multiplayer gaming is depicted according to embodiments of the present invention. At step 401, a computer system running a copy of an online game generates player viewpoint data and captures player communication data using a camera and a microphone. At step 402, the data is processed by a network streamer. At step 403, the processed data is communicated over a computer network to a second computer system (e.g., a peer of view server). At step 404, the client system receives the player viewpoint data and communication data and combines the data with locally rendered in-game content. At step 405, the combined data is presented at the client system.

Embodiments of the present invention are thus described. While the present invention has been described in particular embodiments, it should be appreciated that the present invention should not be construed as limited by such embodiments, but rather construed according to the following claims.

What is claimed is:

1. A method of sharing information with remote players in an online multiplayer game, the method comprising:
   executing the online multiplayer game using a processor and a memory of a computer system;
   capturing a live video stream using a camera of the computer system;
   capturing a live audio stream using a microphone of the computer system;
   generating a player viewpoint of the online multiplayer game during execution thereof, wherein the player viewpoint comprises an in-game video stream and an in-game audio stream; and
   sending the live video stream, the live audio stream, and the player viewpoint for receipt by a second computer system;
   accessing the live video stream, the live audio stream, and the player viewpoint on the second computer system using a third computer system;
   combining the live video stream and the in-game video stream to create a composite video stream;
   combining the live audio stream and the in-game audio stream to create a composite audio stream;
   rendering the composite video stream at the third computer system within a graphical user interface of the online multiplayer game; and
   reproducing the composite audio stream at the third computer system during execution of the online multiplayer game by the third computer system,
   wherein the computer system and the third computer system are concurrently executing the online multiplayer game, the graphical user interface of the online multiplayer game comprises interactive in-game content generated by the third computer system, and wherein the composite video stream is presented alongside the interactive in-game content generated by the third computer system.

2. The method of claim 1, further comprising performing at least one of compression, encryption, or encoding on the live video stream and the live audio stream.

3. The method of claim 1, further comprising performing at least one of compression, encryption, or encoding on the in-game video stream and the in-game audio stream.

4. The method of claim 1, wherein the in-game video stream is generated using a 3D driver.

5. The method of claim 1, wherein said sending utilizes a computer network and wherein the computer network comprises the Internet.

6. The method of claim 1, wherein said sending utilizes a computer network and wherein the computer network comprises a local area network.

7. A method of sharing an online multiplayer game, the method comprising:
   executing the online multiplayer game using a processor and a memory of a computer system;
   capturing a live video stream using a camera communicatively coupled to the computer system;
   capturing a live audio stream using a microphone communicatively coupled to the computer system;
   generating a player viewpoint of the online multiplayer game during execution, wherein the player viewpoint comprises an in-game video stream and an in-game audio stream; and
   sending the live video stream, the live audio stream, and the player viewpoint for receipt by a host using a computer network, wherein: the host is operable to connect to a second computer system using the computer network; the second computer system is operable to concurrently execute the online multiplayer game; the live video stream and the in-game video stream are combined to create a composite video stream; the live audio stream and the in-game audio stream are combined to create a composite audio stream; the composite video stream is operable to be rendered at the second computer system within a graphical user interface of the online multiplayer game; the graphical user interface of the online multiplayer game comprises interactive in-game content generated by the second computer system; and wherein the composite video stream is presented alongside the interactive in-game content generated by the second computer system.

8. The method of claim 7, further comprising performing at least one of compression, encryption, or encoding on the live video stream and the live audio stream.

9. The method of claim 7, further comprising performing at least one of compression, encryption, or encoding on the in-game video stream and the in-game audio stream.

10. The method of claim 7, wherein the in-game video stream is generated using a 3D driver.

11. The method of claim 7, wherein the computer network comprises the Internet.

12. The method of claim 7, wherein the computer network comprises a local area network.

13. An apparatus for sharing a player viewpoint and audio-video communication with remote players of an online multiplayer game, comprising:
   a processor and memory configured to execute instructions of an online multiplayer game, wherein the instructions, when executed, generate the player viewpoint comprising in-game audio data and in-game video data;
   a camera for capturing a live video stream;
   a microphone for capturing a live audio stream;
   a network streamer for sending the in-game audio data, the in-game video data, the live video stream, and the live audio stream for receipt by a host using a computer network and receiving data from the host using the computer network;
   a video compositor for combining the in-game video data, the live video stream, and local in-game video data to create a composite video stream; and
   an audio compositor for combining in-game audio data, live audio stream, and local in-game audio data to create a composite audio stream, wherein: the host connects to a second computer system using the computer network; the second computer system is concurrently executing a copy of the online multiplayer game; and the composite video stream and the composite audio stream are presented at the second computer system such that the in-game audio and video and the live audio and video streams are presented alongside interactive in-game content generated by the second computer system within a graphical user interface of the online multiplayer game.

14. The apparatus of claim 13, further comprising a 3D driver for translating video data instructions.

15. The apparatus of claim 13, further comprising a video encoder for encoding video data and an audio encoder for encoding audio data.

16. The apparatus of claim 15, further comprising a video decoder for decoding video data and an audio decoder for decoding audio data.

\* \* \* \* \*